(12) United States Patent
Fan-Chiang

(10) Patent No.: US 11,822,812 B2
(45) Date of Patent: Nov. 21, 2023

(54) METHOD AND APPARATUS FOR DISTRIBUTED DIRECT MEMORY ACCESS FOR SYSTEM ON CHIP PERFORMING READ OR WRITE OPERATIONS

(71) Applicant: HON HAI PRECISION INDUSTRY CO., LTD., New Taipei (TW)

(72) Inventor: Chiung-Hsi Fan-Chiang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 55 days.

(21) Appl. No.: 17/554,479

(22) Filed: Dec. 17, 2021

(65) Prior Publication Data

US 2022/0197545 A1 Jun. 23, 2022

(30) Foreign Application Priority Data

Dec. 23, 2020 (CN) .......................... 202011546234.8

(51) Int. Cl.
*G06F 3/00* (2006.01)
*G06F 3/06* (2006.01)
*G06F 13/42* (2006.01)
*G06F 13/28* (2006.01)

(52) U.S. Cl.
CPC .......... *G06F 3/0655* (2013.01); *G06F 3/0604* (2013.01); *G06F 3/0673* (2013.01); *G06F 13/28* (2013.01); *G06F 13/4221* (2013.01); *G06F 2213/0026* (2013.01); *G06F 2213/28* (2013.01)

(58) Field of Classification Search
CPC ...... G06F 3/0655; G06F 3/0604; G06F 13/28; G06F 2213/28; G06F 13/4221; G06F 3/0673; G06F 3/00
See application file for complete search history.

(56) References Cited

U.S. PATENT DOCUMENTS

| 5,875,351 A | * | 2/1999 | Riley | ...................... G06F 13/28 |
| | | | | 710/22 |
| 5,898,694 A | * | 4/1999 | Ilyadis | .................. G06F 13/374 |
| | | | | 370/461 |
| 6,874,039 B2 | | 3/2005 | Ganapathy et al. | |
| 7,464,197 B2 | * | 12/2008 | Ganapathy | .............. G06F 12/08 |
| | | | | 710/24 |

FOREIGN PATENT DOCUMENTS

TW I268426 B 12/2006

\* cited by examiner

*Primary Examiner* — Tammara R Peyton
(74) *Attorney, Agent, or Firm* — ScienBiziP, P.C.

(57) ABSTRACT

A method of providing more efficient and streamlined data access to DRAM storage medium by all of multiple processors within a system on a chip (SoC) requires every processor to send use-of-bus request. When the request is for local access (that is, for access to that part of DRAM which is reserved for that processor), the processor reads or writes to the DRAM storage medium through its own arbitrator and own memory controller. When the request is for non-local access (that is, to DRAM within the storage medium which is reserved for another processor), the processor reads or writes to the "foreign" address in the storage medium through its own arbiter, its own memory controller, and its own DMA controller. A data access system is also disclosed.

12 Claims, 6 Drawing Sheets

METHOD AND APPARATUS FOR DISTRIBUTED DIRECT MEMORY ACCESS FOR SYSTEM ON CHIP PERFORMING READ OR WRITE OPERATIONS

FIELD

The subject matter herein generally relates to IT communications, to a data access system and method.

BACKGROUND

System-on-a-Chip (SoC) is an integrated circuit chip. The SoC includes one or more processor units, and may include internal memory (for example, static random access memory (SRAM)), or may be integrated with external memory device (for example, dynamic random access memory (DRAM)), for a memory capacity greater than that of internal memory. The processor accesses the memory on the SoC in bus mode, and DRAM is accessed through a single memory controller. The processor units on the SoC share a large memory pool. When multiple processors are transmitting and requesting data, data transmission efficiency is low and delay is lengthy.

An improvement is required.

BRIEF DESCRIPTION OF THE DRAWINGS

Implementations of the present disclosure will now be described, by way of embodiments, with reference to the attached figures.

DETAILED DESCRIPTION

Figure 1:
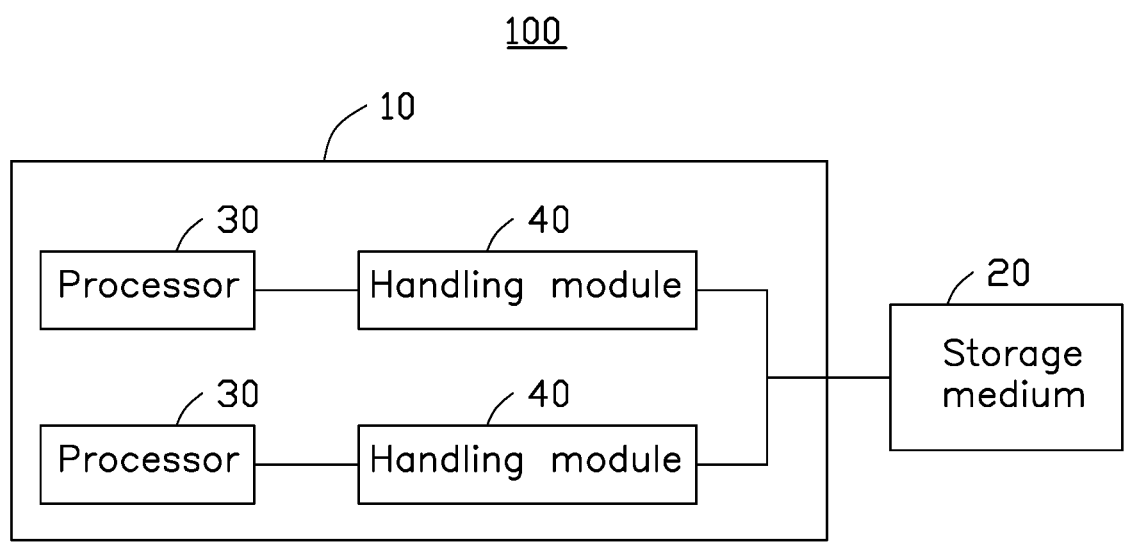
FIG. 1 is a schematic diagram of an embodiment of a data access system.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series, and the like.

FIG. 1 illustrates a data access system 100 in accordance with an embodiment of the present disclosure. The data access system 100 includes a system-on-a-chip (SoC) 10 and a storage medium 20, the medium 20 comprising DRAM memory. The SoC 10 and the storage medium 20 can communicate via a bus, the bus may be a peripheral component interconnect express (PCIe) bus.

In at least one embodiment, the data access system 100 reduces processing inefficiencies caused by insufficient bandwidth of a memory controller 43 in accessing dynamic random access memory (DRAM), and improves access speed of a processor 30 on the system on chip 10 to the storage medium 20.

In at least one embodiment, the storage medium 20 may allocate a certain memory address space for each processor 30.

In at least one embodiment, the SoC 10 integrates a complete system on a single chip. The system-on-chip 10 includes at least two processors 30 and a handling module 40 for each processor 30. The handling module 40 includes a direct memory access (DMA) controller 41, an arbiter 42, and a memory controller 43.

In at least one embodiment, the processor 30 includes a central processing unit (CPU), a graphics processing unit (GPU), or a digital signal processor.

In at least one embodiment, the storage medium 20 may be a non-volatile memory express (NVMe) solid state disk (SSD), or may be other types of storage media. In one embodiment, the storage medium 20 is a DRAM.

In at least one embodiment, each storage medium 20 runs a DMA controller, that is, the DMA controller 41, which directly moves data to be read from the storage medium 20 to the memory corresponding to the processor 30, such as double-rate synchronous DRAM.

In at least one embodiment, the memory controller 43 controls the memory and is responsible for data exchange between memory and a processor 30. Data is transmitted from the memory controller 43 to its own processor 30.

In the embodiment, a plurality of devices or modules of the system-on-chip 10 may simultaneously apply for use of the bus. To avoid bus conflicts, the arbiter 42 controls and manages applicants which need to exclusively use the bus in the system. When several applicants submit bus requests at the same time, the use of the bus is given to a processor 30 according to arbitration with a certain priority algorithm.

The processor 30 sends request, the request including an operation type and an address, the operation type including a read operation or a write operation.

When the request is for local memory access, a processor 30 will perform a read or write operation on the storage medium 20 through the arbiter 42 and the memory controller 43 based on the address.

When the request is for non-local memory access, the processor 30 will perform a read or write operation on the storage medium 20 through the arbiter 42 and the memory controller 43 based on the address.

Figure 2:
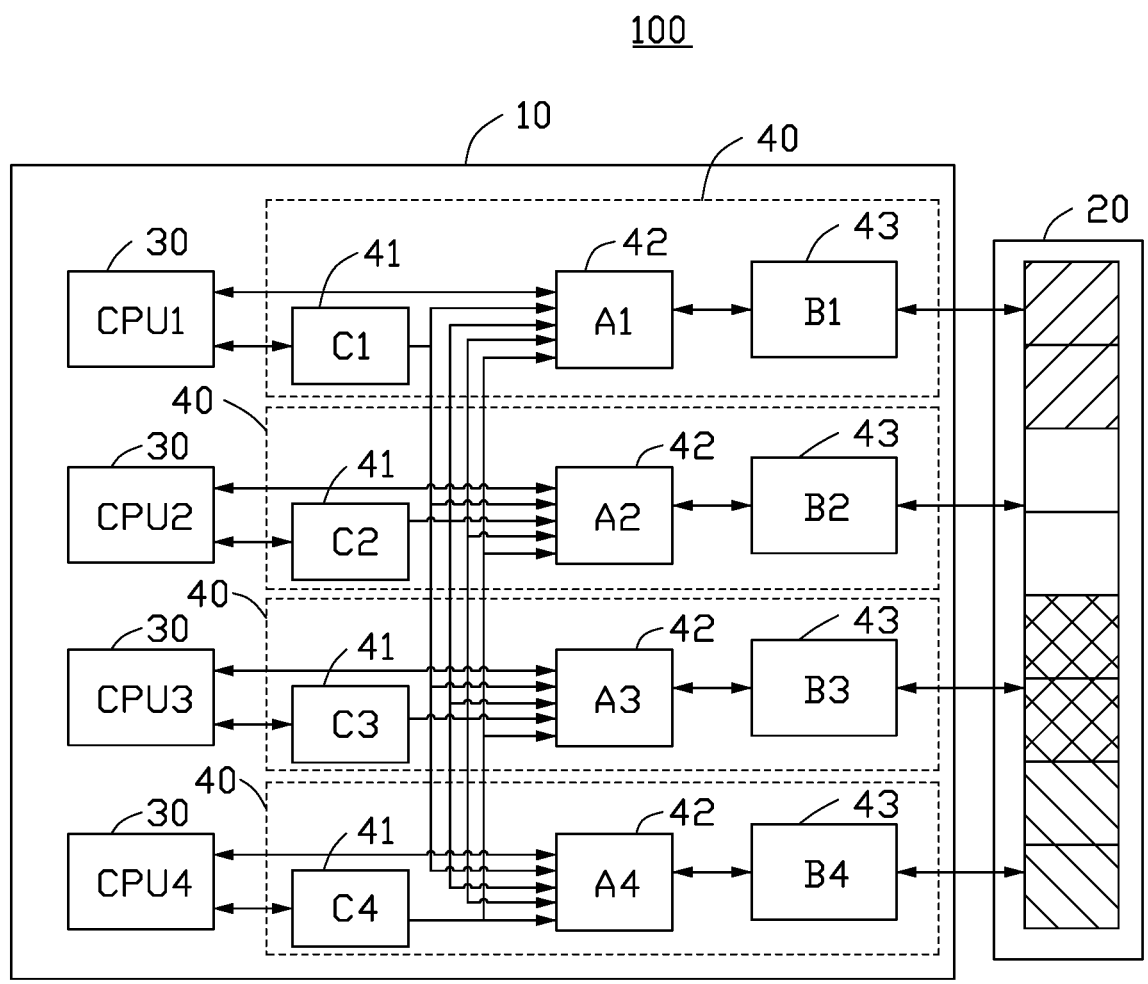
FIGS. 2 and 3 are schematic diagrams of an embodiment of a handling module.
Figure 3:
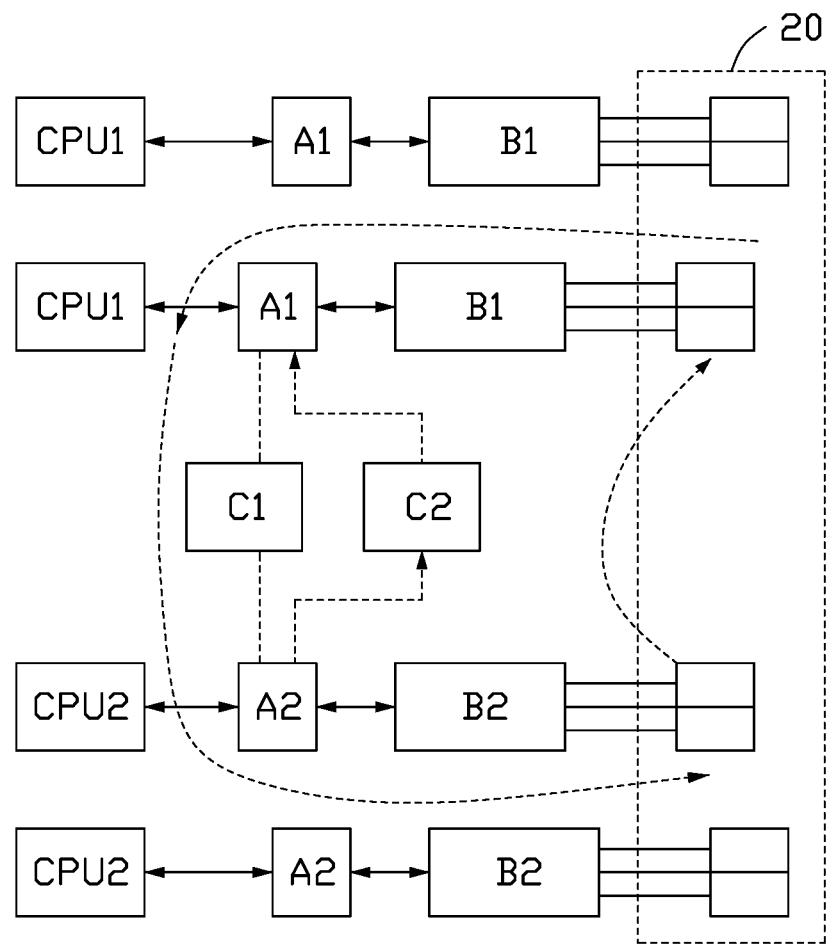

FIGS. 2 and 3 illustrate the work flow of the handling module 40.

When the request information is local access, based on the address, the processor 30 reads or writes the storage medium 20 through its corresponding arbiter 42 and memory controller 43 to complete the local memory access of the processor 30.

When the request information is non-local memory access, based on the address, the processor 30 reads or writes the storage medium 20 through its corresponding arbiter 42 and memory controller 43 to complete the non-local memory access of the processor 30.

As shown in FIG. 2, taking one processor 30 as an exemplary central processing unit (CPU1), the CPU1 has an arbiter A1, a memory controller B1, and a DMA controller C1. Another exemplary central processing unit (CPU2) has an arbiter A2, a memory controller B2, and a DMA controller C2. Another exemplary central processing unit (CPU3) has an arbiter A3, a memory controller B3, and a DMA controller C3. Another exemplary central processing unit (CPU4) has an arbiter A4, a memory controller B4, and a DMA controller C4.

Each CPU has its corresponding and local storage space address, "local" when the central processing unit accesses its own memory space, but non-local when the central processing unit accesses the memory space of other CPU.

Referring to FIG. 3, the working process of the handling module 40 corresponding to each processor 30 is as follows:

When CPU1 wants local access, the working mode of CPU1 is the memory controller mode, and CPU1 sends a first control command to memory controller B1. The first control command is used to instruct the memory controller B1 to obtain a Request. The memory controller B1 sends a bus request signal to the arbiter A1, and the arbiter A1 sends bus usage right to the memory controller B1. The memory controller B1 performs a read operation or a write operation in relation to the requested local address on the storage medium 20.

During the read operation, the memory controller B1 reads the first data from the requested address, and the CPU1 receives the first data sent by the memory controller B1.

During the write operation, the memory controller B1 writes the second data sent by the CPU1 into the requested local address of the storage medium 20.

When CPU1 wants to perform non-local access, when the CPU1 wants to exchange data with CPU2, the working mode of CPU1 is DMA control mode, and CPU1 sends the second control command to its DMA controller C1. The second control command is used to instruct the DMA controller C1 to obtain the request, and the DMA controller C1 sends a bus request signal to the corresponding arbiter A1. The arbiter A1 sends the bus usage right to the DMA controller C1, and the DMA controller C1 reads or writes to the requested non-local address in the storage medium 20 through the memory controller 43.

During a write operation, the DMA controller C1 receives the third data sent by the CPU1, and sends a bus request signal to the arbiter A2 corresponding to the destination address. After obtaining the right to use the bus, the DMA controller C1 sends the third data to the first memory controller B2 so that the first memory controller B2 writes the third data to the to the non-local destination address in the storage medium 20 of the CPU2.

When performing a read operation, the DMA controller C1 sends a bus request signal to the arbiter A2 for reading from the non-local source address. After obtaining the right to use the bus, the DMA controller C1 sends the non-local reading-source address to the second memory controller B2 corresponding to the source address. The second memory controller B2 reads fourth data from the source address. The DMA controller C1 receives the fourth data, and the CPU1 reads the fourth data through the DMA controller C1.

In the embodiment, when performing non-local memory access, each processor 30 uses its own memory controller 43 to directly access the storage medium 20. When performing non-local access, each processor 30 uses its DMA controller 41 to move data directly between two or more processors 30, which shortens the time of data transmission and improves efficiency.

In one embodiment, the SoC 10 and the storage medium 20 are connected wafer-on-wafer.

In the embodiment, the wafer of the system-on-chip 10 and the IO signal lines of wafer of the storage medium 20 are connected together through the wafer on wafer, which simplifies the number of IO pins. The IO port of the storage medium 20 does not need lead-out pins, thereby reducing delay and power consumption, and because the chip of the system-on-chip 10 and the chip of the storage medium 20 are integrated, the size of the printed circuit board can be reduced in terms of layout and area of the storage medium 20, the production cost and wiring complexity of the circuit board is also reduced.

Figure 4:
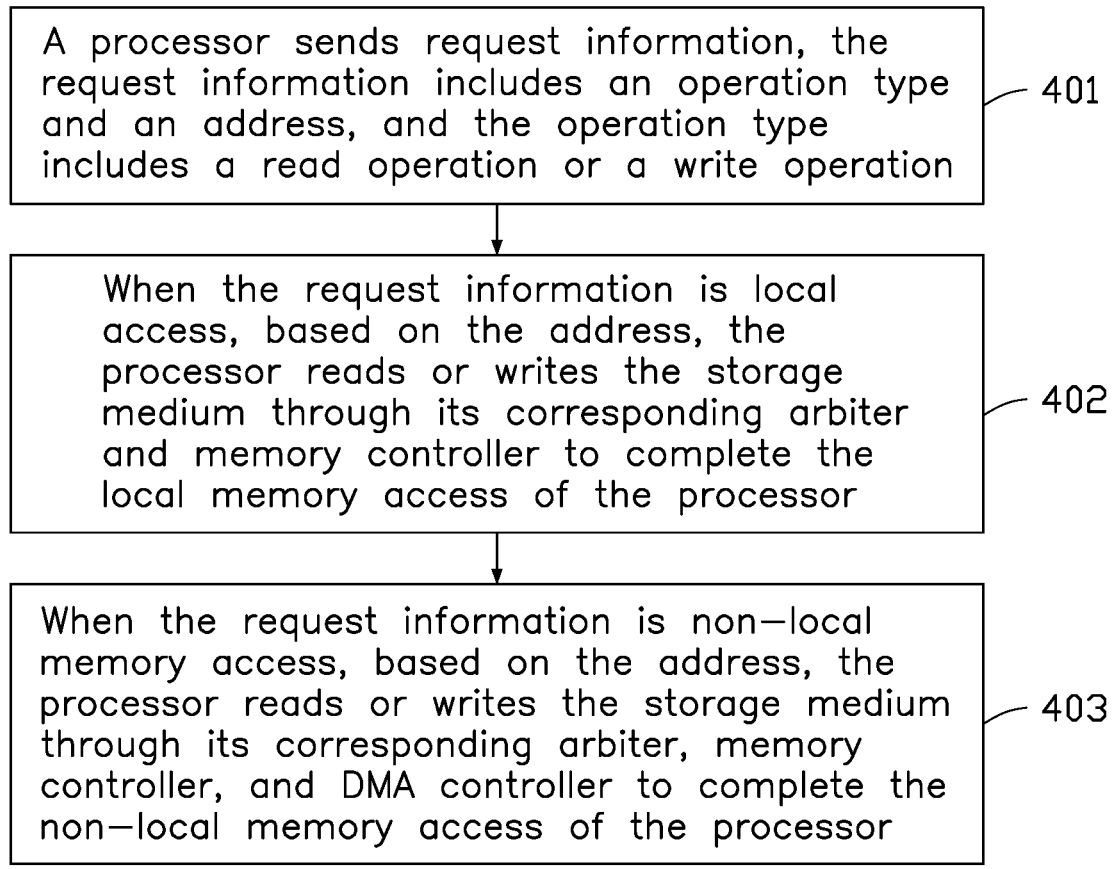
FIG. 4 is a flowchart of an embodiment of a data access method.

FIG. 4 is a flowchart depicting an embodiment of a data access method. The method is provided by way of example, as there are a variety of ways to carry out the method. The method is applied to the data access system 100. The data access system 100 includes a SoC 10 and a storage medium 20, and the SoC 10 and the storage medium 20 communicate through a bus. The SoC 10 includes at least two processors 30 and a handling module 40 of each processor 30. The handling module 40 includes a DMA controller 41, an arbiter 42, and a memory controller 43.

The method described below can be carried out using the configurations illustrated in FIGS. 1-3 for example, and various elements of these figures are referenced in explaining the example method. Each block shown in FIG. 4 represents one or more processes, methods, or subroutines, carried out in the example method. Furthermore, the illustrated order of blocks is illustrative only and the order of the blocks can change. Additional blocks can be added or fewer blocks may be utilized, without departing from the present disclosure. The example method can begin at block 401.

At block 401, the processor sends request information, the request information includes an operation type and an address, and the operation type includes a read operation or a write operation.

At block 402, when the request information is local access, based on the address, the processor reads or writes the storage medium through its corresponding arbiter and memory controller to complete the local memory access of the processor.

In the embodiment, When the processor 30 performs local access and wants to perform data access to the allocated memory, the memory controller 43 performs data transfer, which can improve the data access efficiency.

Figure 5:
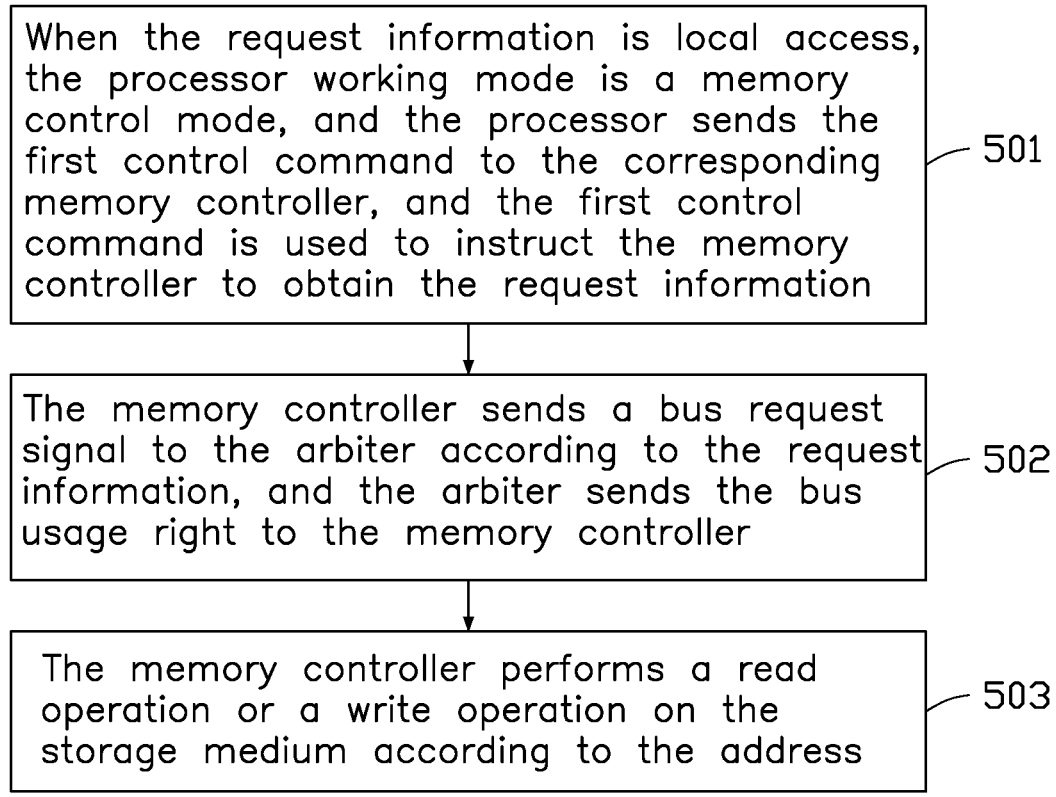
FIG. 5 is a schematic diagram of the detailed process of block 402 of the method of FIG. 4.

Please refer to FIG. 5, which is a detailed flowchart of block 402.

At block 501, when the request is for local memory access, the processor working mode is a memory control mode, and the processor sends the first control command to the memory controller. The first control command is used to instruct the memory controller to obtain the request information.

At block 502, the memory controller sends a bus request signal to the arbiter according to the request information, and the arbiter sends the bus usage right to the memory controller.

At block 503, the memory controller performs a read operation or a write operation on the storage medium according to the address.

In the embodiment, when the processor 30 needs to perform local access for data access to the memory address space allocated to it, the processor 30 performs local access, and performs data transfer through the memory controller 43 corresponding to the processor 30 to achieve read or write to own memory.

In one embodiment, IMC bus can be used for communication during local access.

Furthermore, during a read operation, the memory controller 43 reads the first data according to the address, and the processor 30 receives the first data sent by the memory controller 43.

Alternatively, during a write operation, the memory controller 43 writes the second data sent by the processor 30 to the storage medium 20 according to the address.

At block 403, when the request is for non-local memory access, based on the address, the processor reads or writes the storage medium through its corresponding arbiter, memory controller, and DMA controller to complete the non-local memory access of the processor.

In one embodiment, non-local access uses Quick Path Interconnect (QPI) to communicate.

Figure 6:
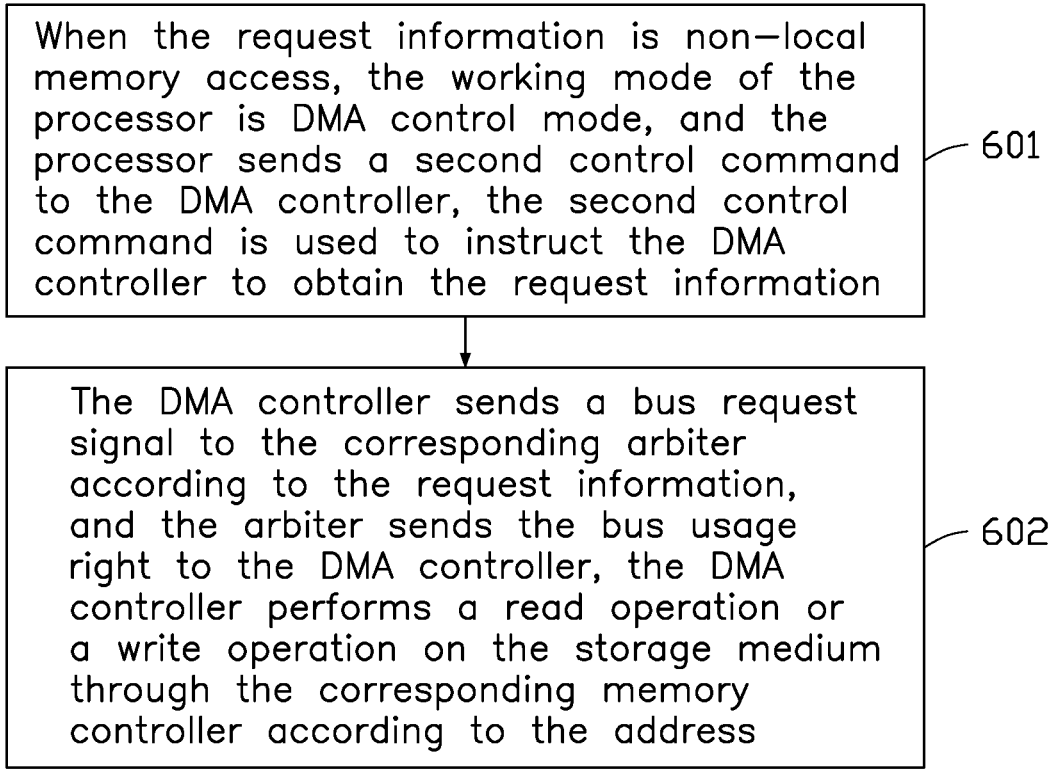
FIG. 6 is a schematic diagram of the detailed process of block 403 of the method of FIG. 4.

Please refer to FIG. 6, which is a detailed flowchart of block 403.

At block 601, when the request is for non-local memory access, the working mode of the processor is DMA control mode, and the processor sends a second control command to the DMA controller. The second control command is used to instruct the DMA controller to obtain the request information.

At block 602, the DMA controller sends a bus request signal to the corresponding arbiter according to the request information, and the arbiter sends the bus usage right to the DMA controller. The DMA controller performs a read operation or a write operation on the storage medium through the corresponding memory controller according to the address.

In one embodiment, the DMA controller 41 sends the address to the memory controller 43, and the memory controller 43 performs a read operation or a write operation on the storage medium 20 according to the address.

During the write operation, the DMA controller 41 receives the third data sent by the processor 30, and sends a bus request signal to the arbiter 42 corresponding to the destination address in the address. After obtaining the right to use the bus, the DMA controller 41 sends the third data to the first memory controller corresponding to the destination address, and the first memory controller writes the third data to the storage medium 20.

Alternatively, during a read operation, the DMA controller 41 sends a bus request signal to the corresponding arbiter 42 according to the source address in the address. After obtaining the right to use the bus, the DMA controller 41 sends the source address to a second memory controller corresponding to the source address, and the second memory controller reads fourth data according to the source address. The DMA controller 41 receives the fourth data, and the processor 30 reads the fourth data through the DMA controller 41.

In the embodiment, when the processor 30 wants to access the memory address space of other processors 30, it performs non-local access, and performs data transfer through the DMA controller 41 of the processor 30, thereby increasing the rate at which the processor accesses the memory of other processors.

Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A data access method using in a data access system, the data access system comprises a system-on-chip (SoC) and a storage medium, the SoC comprises at least two processors and a handling module for each processor, the handling module comprises a DMA controller, an arbiter and a memory controller, comprising:

sending request information by the processor, wherein the request information comprises an operation type and an address, and the operation type comprises a read operation or a write operation;

wherein when the request information is for local access, the processor reads or writes the storage medium through the arbiter and the memory controller to complete the local memory access of the processor;

wherein when the request information is for non-local memory access, the processor reads or writes the storage medium through the arbiter, the memory controller, and the DMA controller to complete non-local memory access of the processor;

wherein when the request information is non-local memory access, the working mode of the processor is a DMA control mode, and the processor sends a second control command to the DMA controller, and the second control command is used to instruct the DMA controller to obtain the request information; the DMA controller sends a bus request signal to the arbiter according to the request information, and the arbiter sends the bus use right to the DMA controller; and the DMA controller performs a read operation or a write operation on the storage medium through the memory controller according to the address; and wherein the DMA controller sends the address to the memory controller, and the memory controller performs a read operation or a write operation on the storage medium according to the address.

2. The data access method of claim 1, wherein when a working mode of the processor is a memory control mode, the processor sends a first control command to the memory controller, and the first control command is used to instruct the memory controller to obtain the request information; the memory controller sends a bus request signal to the arbiter according to the request information, and the arbiter sends bus usage right to the memory controller; and the memory controller performs a read operation or a write operation on the storage medium according to the address.

3. The data access method of claim 2, wherein the memory controller reads the first data according to the address during a read operation, and the processor receives the first data sent by the memory controller; or the memory controller writes the second data sent by the processor to the storage medium according to the address during a write operation.

4. The data access method of claim 1, wherein the DMA controller receives a third data sent by the processor during the write operation, and sends a bus request signal to the arbiter corresponding to a destination address in the address; after obtaining right to use the bus, the DMA controller sends the third data to a first memory controller corresponding to the destination address, and the first memory controller writes the third data to the storage medium.

5. The data access method of claim 4, wherein the DMA controller sends a bus request signal to the arbiter according to the source address in the address during the read operation, after obtaining the right to use the bus, the DMA controller sends the source address to a second memory controller corresponding to the source address, the second memory controller reads a fourth data according to the source address, the DMA controller receives the fourth data, and the processor reads the fourth data through the DMA controller.

6. A data access system comprising:
a storage medium;
a system-on-chip (SoC) comprising at least two processors and a handling module for each processor; wherein the handling module comprises a DMA controller, an arbiter and a memory controller;
wherein the processor sends request information, the request information comprises an operation type and an address, and the operation type comprises a read operation or a write operation;
wherein the processor is configured to perform a read operation or a write operation on the storage medium through the arbiter and the memory controller based on the address when the requested information is for local access, to complete the local memory access;
wherein the processor is configured to perform a read operation or a write operation on the storage medium through the arbiter, the memory controller, and the DMA controller based on the address when the requested information is for non-local access, to complete the non-local memory access;
wherein when the request information is non-local memory access, the working mode of the processor is a DMA control mode, and the processor sends a second control command to the DMA controller, and the second control command is used to instruct the DMA controller to obtain the request information; the DMA controller sends a bus request signal to the arbiter according to the request information, and the arbiter sends the bus use right to the DMA controller; and the DMA controller performs a read operation or a write operation on the storage medium through the memory controller according to the address; and wherein the DMA controller sends the address to the memory controller, and the memory controller performs a read operation or a write operation on the storage medium according to the address.

7. The data access system of claim 6, wherein when a working mode of the processor is a memory control mode, the processor sends a first control command to the memory controller, and the first control command is used to instruct the memory controller to obtain the request information; the memory controller sends a bus request signal to the arbiter according to the request information, and the arbiter sends bus usage right to the memory controller; and the memory controller performs a read operation or a write operation on the storage medium according to the address.

8. The data access system of claim 7, wherein the memory controller reads the first data according to the address during a read operation, and the processor receives the first data sent by the memory controller; or the memory controller writes the second data sent by the processor to the storage medium according to the address during a write operation.

9. The data access system of claim 6, wherein the DMA controller receives a third data sent by the processor during the write operation, and sends a bus request signal to the arbiter corresponding to a destination address in the address; after obtaining right to use the bus, the DMA controller sends the third data to a first memory controller corresponding to the destination address, and the first memory controller writes the third data to the storage medium.

10. The data access system of claim 9, wherein the DMA controller sends a bus request signal to the arbiter according to the source address in the address during the read operation, after obtaining the right to use the bus, the DMA controller sends the source address to a second memory controller corresponding to the source address, the second memory controller reads a fourth data according to the source address, the DMA controller receives the fourth data, and the processor reads the fourth data through the DMA controller.

11. The data access system of claim 6, wherein the system-on-chip and the storage medium are connected by wafer on wafer.

12. The data access system of claim 6, wherein the storage medium is dynamic random access memory.

* * * * *